United States Patent
Pickelman, Jr. et al.

(10) Patent No.: US 8,851,028 B2
(45) Date of Patent: Oct. 7, 2014

(54) COOLING SYSTEM FOR CLUTCH

(75) Inventors: Dale M. Pickelman, Jr., Marshall, MI (US); Theodore A. Malott, Jackson, MI (US); Thomas M. Tembreull, Homer, MI (US)

(73) Assignee: Borg Warner Inc., Auburn Hills, MI (US)

( * ) Notice: Subject to any disclaimer, the term of this patent is extended or adjusted under 35 U.S.C. 154(b) by 463 days.

(21) Appl. No.: 12/921,221

(22) PCT Filed: Mar. 2, 2009

(86) PCT No.: PCT/US2009/035697
§ 371 (c)(1),
(2), (4) Date: Dec. 30, 2010

(87) PCT Pub. No.: WO2009/114317
PCT Pub. Date: Sep. 17, 2009

(65) Prior Publication Data
US 2011/0088868 A1    Apr. 21, 2011

Related U.S. Application Data

(60) Provisional application No. 61/036,071, filed on Mar. 12, 2008.

(51) Int. Cl.
    F01P 9/00     (2006.01)
    F01P 3/00     (2006.01)
    F01P 5/10     (2006.01)
    F01P 7/10     (2006.01)

(52) U.S. Cl.
    USPC ............... 123/41.1; 123/41.01; 123/41.42; 123/41.44; 123/41.49; 123/195 P

(58) Field of Classification Search
    USPC ............ 123/41.1, 41.01, 41.42, 41.44, 41.49, 123/190 P
    See application file for complete search history.

(56) References Cited

U.S. PATENT DOCUMENTS

| | | | | |
|---|---|---|---|---|
| 1,980,811 | A * | 11/1934 | Ljungstrom | 123/41.46 |
| 2,020,748 | A * | 11/1935 | Waseige | 192/113.36 |
| 3,452,848 | A * | 7/1969 | Brunner | 192/113.1 |
| 3,559,786 | A * | 2/1971 | Long, Jr. | 192/58.682 |
| 3,568,647 | A * | 3/1971 | Adams | 123/41.12 |
| 3,768,613 | A * | 10/1973 | Brunner | 192/113.34 |
| 4,142,619 | A * | 3/1979 | Spokas | 192/113.35 |
| 4,312,433 | A * | 1/1982 | Bopp | 192/58.7 |
| 4,456,110 | A * | 6/1984 | Hanks et al. | 192/82 T |
| 4,483,430 | A * | 11/1984 | Carmichael et al. | 192/85.53 |
| 4,589,535 | A * | 5/1986 | Hall et al. | 192/70.12 |
| 4,627,523 | A | 12/1986 | Light | |
| 4,627,524 | A * | 12/1986 | Hayashi et al. | 192/58.682 |

(Continued)

FOREIGN PATENT DOCUMENTS

| | | |
|---|---|---|
| JP | 1163023 | 3/1999 |
| JP | 11063023 | 3/1999 |

*Primary Examiner* — Lindsay Low
*Assistant Examiner* — Charles Brauch

(57) ABSTRACT

A cooling system for a fan drive device, particularly for a wet friction clutch. The clutch shaft member is attached to a shaft mounting plate and ATF is circulated through them. The shaft mounting plate is connected in turn to an engine mounting plate which has engine coolant circulated through it at a lower temperature. The shaft mounting plate and engine mounting plates both have passageways for circulation of fluids therein.

13 Claims, 3 Drawing Sheets

(56) References Cited

U.S. PATENT DOCUMENTS

| | | | |
|---|---|---|---|
| 4,718,378 A * | 1/1988 | Child | 123/41.12 |
| 4,741,421 A * | 5/1988 | Johnston | 192/58.682 |
| 4,924,987 A * | 5/1990 | Kennedy | 192/58.8 |
| 5,487,457 A * | 1/1996 | Isanhart | 192/58.2 |
| 5,501,183 A * | 3/1996 | Takayama | 123/41.12 |
| 5,947,247 A * | 9/1999 | Cummings, III | 192/70.12 |
| 6,021,747 A | 2/2000 | Gee et al. | |
| 6,439,172 B1 | 8/2002 | McGovern et al. | |
| 6,561,141 B2 | 5/2003 | Stretch et al. | |
| 2002/0096132 A1* | 7/2002 | Stretch et al. | 123/41.12 |
| 2008/0121488 A1* | 5/2008 | Miyazaki et al. | 192/70.12 |
| 2009/0087604 A1* | 4/2009 | Stewart et al. | 428/35.8 |
| 2009/0114498 A1* | 5/2009 | Arnold et al. | 192/70.12 |

* cited by examiner

COOLING SYSTEM FOR CLUTCH

TECHNICAL FIELD

The present invention relates to vehicle cooling systems, and more particularly to systems for cooling clutches used in vehicle cooling systems.

BACKGROUND OF THE INVENTION

The present invention relates to cooling systems for engines, particularly engines used in vehicles. It is well known that engines and some accessories in vehicles need to be maintained within certain temperature ranges of operation in order to operate effectively and efficiently, and there are numerous systems for accomplishing this in use today. These cooling systems include coolant circulation systems which are used for engines, automatic transmissions, and various accessories. Some of these systems involve the use of cooling fans which are used to pull or push air flow through heat exchangers, such as radiators, and over engines and other accessories in order to help cool them and/or to maintain them within certain temperature ranges of operation.

Many of these cooling fans utilize fluid coupling devices ("fan drives") of the wet friction-type for driving the engine cooling fans. These fan drives result in substantial savings of engine horsepower and typically operate only in the engaged higher speed condition when cooling is needed. These fluid coupling devices have various configurations and applications.

The wet friction fan drives also generate significant heat themselves and various cooling systems have been used in attempts to maintain the operating temperatures of the fan drives within acceptable ranges. These cooling systems include the use of cooling fins on the outer housings, as well as circulation of cooling fluids through part of the fan drives. Although many of these cooling systems for the fluid coupling devices, have proven to be successful, efforts are continuously being made to improve cooling systems for these devices, particularly to increase the capacity of the clutches in their useful load conditions.

It thus is an object of the present invention to provide an improved cooling system for fluid coupling devices of particularly of the wet friction type. It is a further object of the present invention to enhance the capacity of wet friction-type clutches for thermal resistance in the useful load conditions.

SUMMARY OF THE INVENTION

The present invention provides a system and process for improving the cooling of fan drive devices, particularly of the wet friction-type. The fan drive devices are commonly called clutches, and are typically mounted to a shaft which in turn is mounted to a water pump, engine block, or another part of the engine. In one embodiment of the present invention, the mounting shaft is attached to a pair of mounting plates, a shaft mounting plate and an engine mounting plate. The shaft mounting plate has passageways and recesses for circulation of a cooling fluid therein, such as the automatic transmission fluid. The engine mounting plate in turn has a plurality of passageways for circulation of a cooling fluid, such as the engine coolant. The transfer of heat from the automatic transmission fluid circulating in the shaft mounting plate and coming in contact with the engine mounting plate is used to reduce the temperature of the shaft and fan drive device and maintain its temperature within certain limits. The engine coolant, which is circulated through the engine mounting plate, picks up heat from the automatic transmission fluid and carries it through the engine cooling system where it in turn is dissipated by conventional means.

The shaft mounting plate has a plurality of openings in order to be secured to the shaft for the fan drive device. In addition, the shaft mounting plate and the engine mounting plate have mating holes so that the two plates can be secured tightly together by appropriate fasteners. Further, the shaft mounting plate and engine mounting plate can have appropriate slots, openings or the like, in order to be secured to the engine block or other appropriate place in the engine compartment of the vehicle.

Other features, benefits, and advantages of the present invention will become apparent from the following description of the invention, when viewed in accordance with the attached drawings and appended claims.

BRIEF DESCRIPTION OF THE DRAWINGS

FIG. 3A is a cross-sectional view of a component of the cooling system, the cross-section being taken along line 3A-3A in FIG. 6.

FIG. 7 is a plan view of an engine mounting plate for use with an embodiment of the present invention.

FIG. 8 is a cross-sectional view of the engine mounting plate as shown in FIG. 7, the cross section being taken along lines 8-8 in FIG. 7 and in the direction of the arrows.

DESCRIPTION OF PREFERRED EMBODIMENTS

Figure 1:
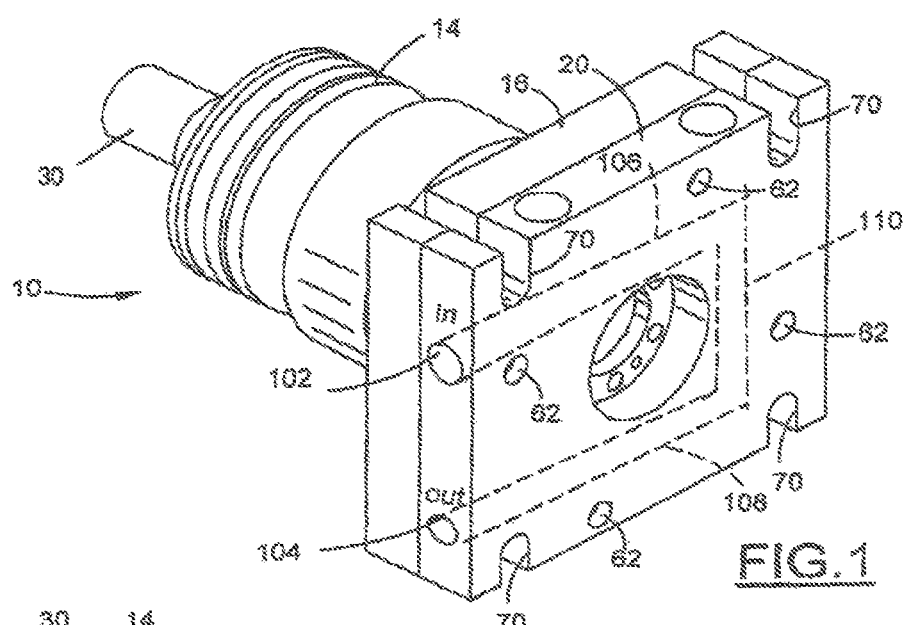
FIG. 1 is a perspective view of a cooling system for a fan drive device in accordance with the present invention.
Figure 2:
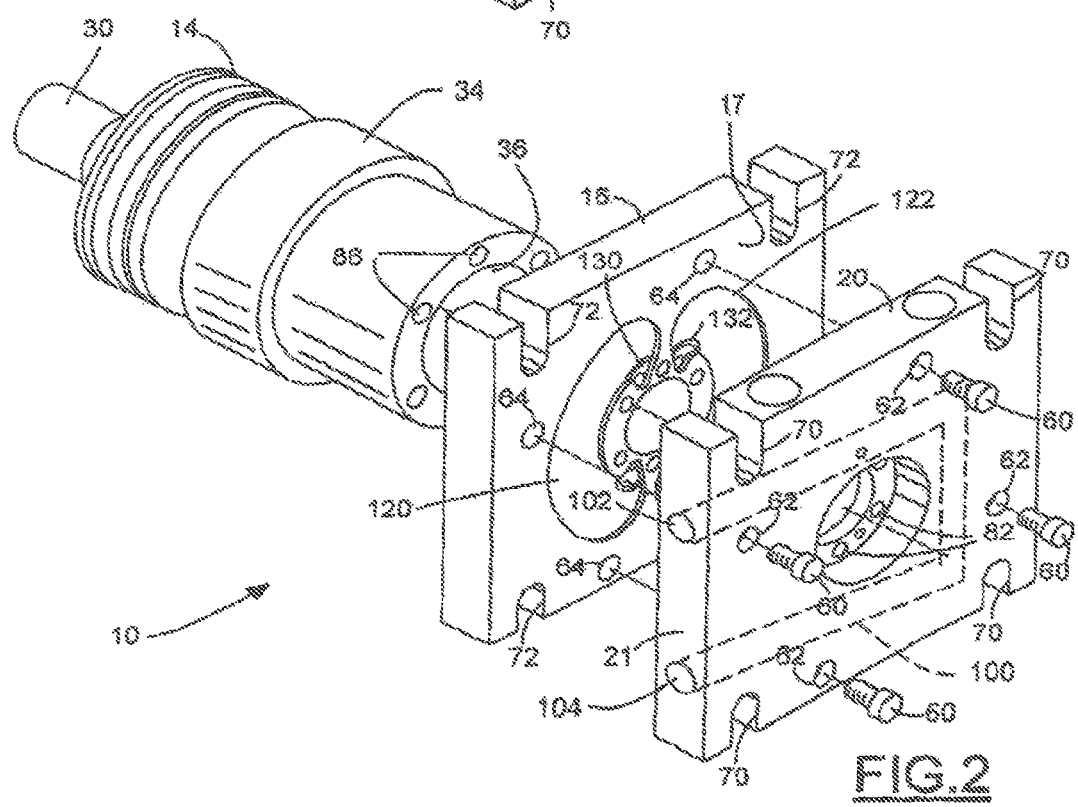
FIG. 2 is a partial exploded view of the cooling system as shown in FIG. 1.

A cooling system in accordance with an embodiment of the present invention is shown in FIG. 1 and designated generally by the reference numeral 10. The cooling system 10 is utilized to assist in cooling a fluid coupling device, particularly of the wet friction type. (The "fluid coupling device" is also commonly known as a "fan drive" or a "clutch".) Wet friction fan drives are in common use today, particularly for operating cooling fans for internal combustion engines. The typical fluid coupling device operates in the engaged, relatively higher speed condition only when cooling is needed, and operates in a disengaged, relatively lower speed condition when little or no cooling is required. Wet friction clutches of the type which can be used with the present invention include those shown and disclosed in U.S. Pat. No. 7,041,911. Since the present invention can be used with any conventional fan drive or clutch, it is not necessary to describe a particular wet friction clutch device here.

The clutch (not shown) is mounted to a mounting shaft 14 which in turn is mounted to a shaft mounting plate 16. The shaft mounting plate in turn is mounted to a second mounting plate 20. (The second mounting plate will be called the "engine mounting plate" herein because it typically is mounted to the engine.) The shaft mounting plate 16 and engine mounting plate 20 can have any particular size and shape so long as they have the internal passageways and/or recesses as set forth below which provide the requisite cooling for the system.

Figure 3:
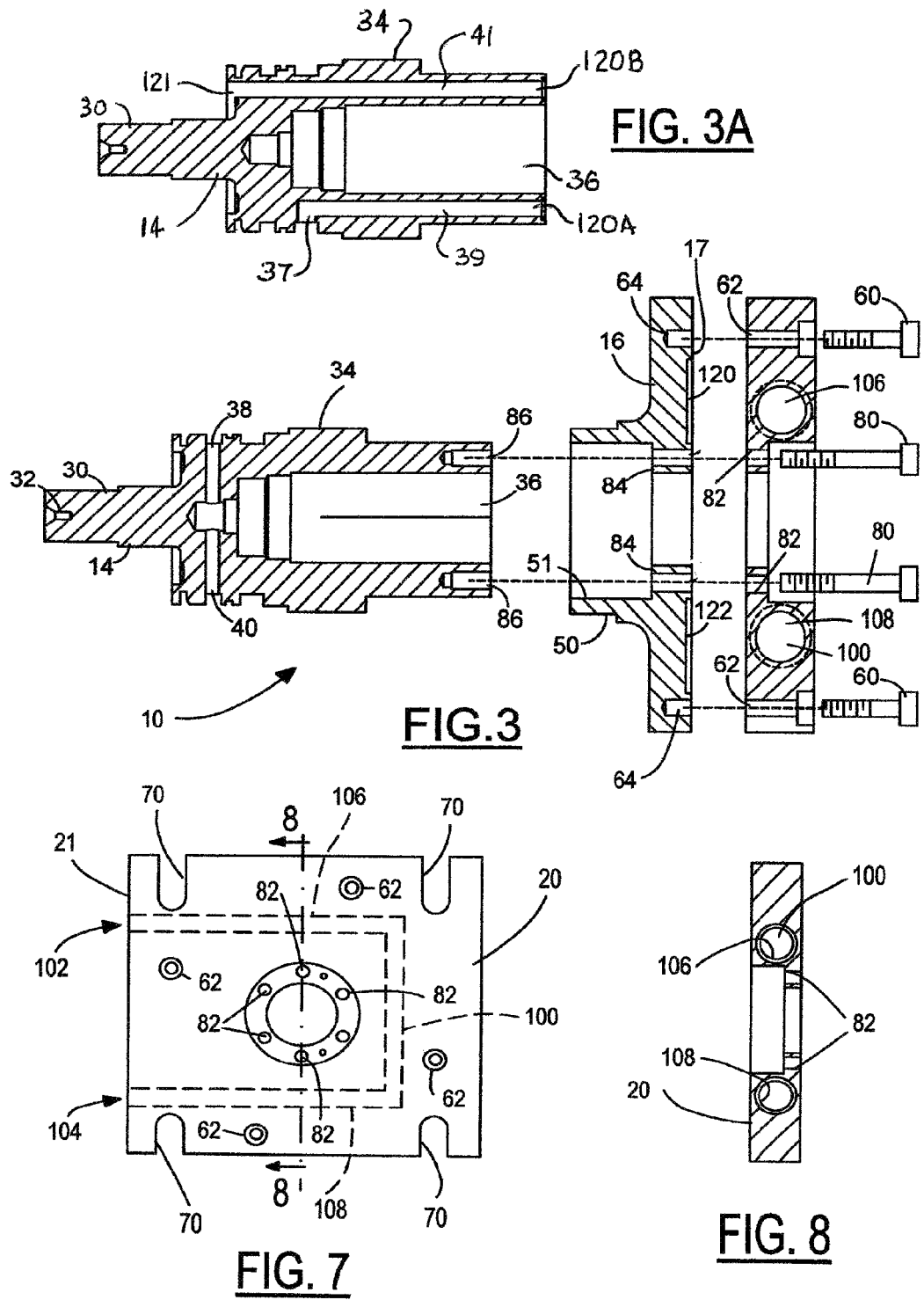
FIG. 3 is an exploded cross-sectional view of the cooling system as shown in FIGS. 1 and 2.
Figures 4, 5:
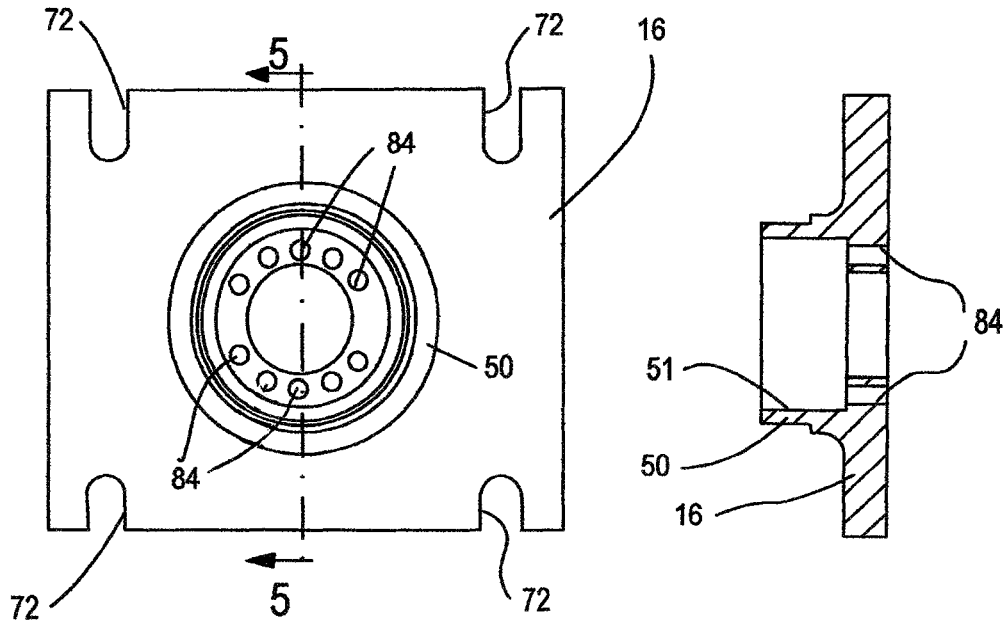
FIG. 4 is a plan view of a shaft mounting plate in accordance with the present invention.
FIG. 5 is a cross-sectional view of the shaft mounting plate as shown in FIG. 4, the cross section being taken along lines 5-5 in FIG. 4 and in the direction of the arrows.
Figure 6:
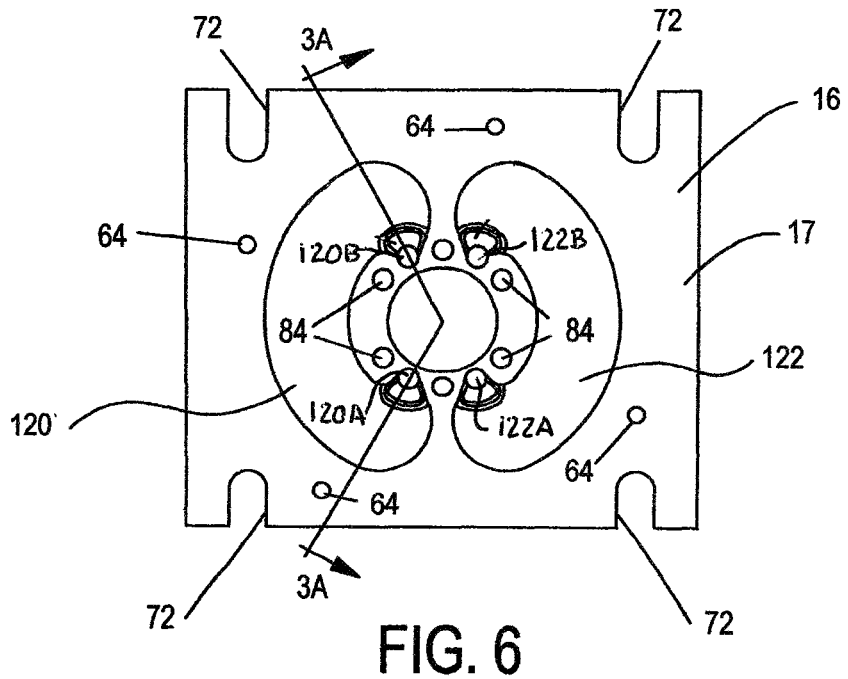
FIG. 6 is a rear plan view of the shaft mounting plate.

The configuration of the mounting shaft 14 for the clutch is shown in more detail in FIGS. 3 and 3A. The mounting shaft 14 includes a forward portion 30 which includes a machining center. The mounting shaft 14 also includes a second (body) portion 34 which is larger than the forward portion 30 and which also is used to mount a portion of the clutch. The body portion 34 includes a central cavity 36, as well as a pair of passageways 38 and 40 which communicate with the cavity 36, and which are part of the clutch control circuit. Passageway port 37 is in communication with the automatic transmission fluid (ATF) system for the transmission of the vehicle. Appropriate lines or conduits (not shown) circulate some of the automatic transmission fluid into this passageway from, for example, a sump. Passageway 39 is used to direct the ATF fluid from the entrance port 37 to opening 120A and into recess 120. The fluid is then directed to opening 120B, through passageway 41 to port 121 where it is directed to the clutch for cooling. From there, the ATF is returned to the sump (not shown) by appropriate lines or conduits (not shown). A corresponding set of ports, passageways, and conduits are in communication with recess 122 for the same purpose.

Also as shown in FIG. 3, the shaft mounting plate 16 includes a circular mounting member 50 which is used to mate with the body portion 34 of the shaft member 14.

The engine mounting plate 20 is secured to the shaft mounting plate 16 by a plurality of bolts or other fasteners 60. The fasteners 60 are positioned through openings 62 in the engine mounting plate 20 and secured in threaded bores 64 in the shaft mounting plate 16. In this regard, although four mating sets of holes and bores 62, 64 are shown in the drawings, it is to be understood that any number of openings and bores can be provided in order to secure the two plates 16, 20 together and any type of fasteners could be utilized. In addition, any other conventional means of securing the two plates 16 and 20 together can be utilized.

Preferably, the mounting plates 16 and 18 are both made from a metal material, such as steel, which has good conductivity and heat transfer.

As shown in the drawings, each of the plates 16 and 18 have a plurality of slots or recesses 70 and 72 which are used to mount the cooling system 10 to the vehicle, preferably to the engine block. Of course, it is understood that other methods known to persons of ordinary skill in the art for attaching or connecting the cooling system to the engine block or other portion of the vehicle can be utilized.

The clutch mounting shaft 14 is secured to the shaft mounting plate 16 and engine mounting plate 20 by a plurality of fasteners, such as bolts 80. The fasteners 80 are positioned through openings 82 in the engine mounting plate 20 and through openings 84 in the shaft mounting plate and secured in threaded bores 86 in the mounting shaft 14. In this regard, as shown in the drawings, preferably four to six sets of mating bores and threaded openings 82, 84 and 86 are shown, together with four to six fasteners 80. It is understood, of course, that any number of mated openings and fasteners can be utilized as necessary in order to securely hold the plates 16 and 18 to the clutch mounting shaft 14.

The engine mounting plate 20 has a circuitous passageway 100 machined or formed in it. The passageway has an inlet 102 and an outlet 104 on a side 21 of the engine mounting plate 20. Passageway 100 includes bores 106, 108, and 110 which can be formed in any conventional manner. The engine mounting plate 20 is adapted to be connected to the cooling system for the engine of the vehicle and appropriate connectors (not shown) are used together with accompanying fluid lines or conduit members (not shown) in order to connect the engine cooling system to the inlet 102 and outlet 104 of the engine mounting plate 20.

The shaft mounting plate 16 has a pair of recesses 120 and 122 machined or formed in the side 17 which is mated with the engine mounting plate 20. Recess 120 is in communication with passageways 39 and 41 through openings 120A and 120B as described above. Similarly, recess 122 is in communication with corresponding passageways (not shown) in body portion 34 through openings 122A and 122B. When automatic transmission fluid is circulated into the passageways in shaft 14, the fluid in turn is circulated into and through the mounting plate 16 and the recesses 120 and 122 and comes into contact with the surface of the engine mounting plate 20. When the automatic transmission fluid is flowing through the recesses 120, 122, heat from the automatic transmission fluid is transferred to the engine mounting plate 20 which is at a lower temperature since it in turn is being heated by the engine coolant.

With use of the present cooling system described herein, it is estimated that the temperature of the fluid coupling device, that is, the wet friction clutch, can be lowered by several degrees F. Heat is transferred from the ATF to the engine coolant. Thus, some of the heat from the clutch can be transferred to the engine through the mounting shaft 14 and mounting plates 16 and 20. This increases the capacity of the clutch for thermal resistance in the useful load conditions.

This invention increases the effectiveness of the wet friction clutch and the effectiveness of the cooling system for the engine. This can result in savings of engine horsepower which in turn can increase the fuel efficiency of the engine and the vehicle itself.

While the invention described in connection with various embodiments, it will be understood that the invention is not limited to those embodiments. On the contrary, the invention covers all alternatives, modifications, and equivalents as may be included within the spirit and scope of the appended claims.

What is claimed is:

1. A cooling system for cooling fan drive liquid coolant in a wet-friction fan drive for a vehicle by transferring heat to engine liquid coolant in the vehicle engine, said system comprising:
   a shaft member for mounting of a fan drive thereon;
   said shaft member having first passageways therein for circulation of the fan drive liquid coolant therein;
   a shaft mounting plate member connected to said shaft member at the distal end thereof; said shaft mounting plate member having second passageways therein in communication with said first passageways for circulation of said fan drive liquid coolant therein; and
   an engine mounting plate member connected to said shaft mounting plate member;
   said shaft mounting plate member having a first substantially planar surface, and said engine mounting plate member having a second substantially planar surface;
   said shaft mounting plate member and said engine mounting plate member being connected together with said first substantially planar surface mating with said second substantially planar surface;
   said engine mounting plate member having third passageways therein for circulation of the engine liquid coolant therein;

said first substantially planar surface at least one recess therein forming a fluid reservoir, said fluid reservoir in communication with at least one of said second passageways;

wherein circulation of said engine liquid coolant in said third passageways acts to transfer heat from said fan drive liquid coolant circulating through said at least one recess.

2. The cooling system for a fan drive as described in claim 1 wherein said first passageways include an internal cavity.

3. The cooling system for a fan drive as described in claim 1 wherein said shaft member, shaft mounting plate member and engine mounting plate member are secured together by fastener members.

4. The cooling system for a fan drive as described in claim 1 wherein said shaft mounting plate member and engine mounting plate member have apertures thereon for connecting said cooling system to a vehicle.

5. The cooling system for a fan drive as described in claim 1 wherein said fan drive liquid coolant is automatic transmission fluid.

6. The cooling system for a fan drive as described in claim 1 further comprising at least two recesses on said first substantially planar surface, each of said at least two recesses forming fluid reservoirs and each in communication with at least one of said second passageways.

7. The cooling system for a fan drive as described in claim 6 wherein said at least two recesses are in fluid communication with one another.

8. The cooling system for a fan drive as described in claim 1 wherein said shaft mounting plate member is a thick sheet of metal material.

9. The cooling system for a fan drive as described in claim 1 wherein said engine mounting plate member is a thick sheet of metal material.

10. The cooling system for a fan drive as described in claim 1 wherein said shaft mounting plate member and said engine mounting plate member have substantially the same size and shape.

11. The cooling system for a fan drive as described in claim 1 wherein said fan drive liquid coolant is at a higher temperature than said engine liquid coolant, and wherein heat from said fan drive liquid coolant-is transferred to said engine liquid coolant.

12. The cooling system for a fan drive as described in claim 1 wherein said third passageways in said engine mounting plate member comprise a substantially U-shaped passageway.

13. The cooling system for a fan drive as described in claim 1 wherein said third passageways in said engine mounting plate member comprise a plurality of passageways substantially parallel to said second substantially planar surface.

\* \* \* \* \*